(12) United States Patent
Lake et al.

(10) Patent No.: US 10,112,323 B2
(45) Date of Patent: Oct. 30, 2018

(54) COMPLETE TOOLING PACKAGES FOR MOLD BUILDING STRUCTURES

(75) Inventors: Randall Lake, Independence, KY (US); Robert Mark Adams, Cincinnati, OH (US); Brian Michael Kruchten, Royalton, MN (US); John Pfaff, Bradenton, FL (US); Louis Paul Schaefer, Trinity, FL (US); Helena Twardowska, Loveland, OH (US)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 819 days.

(21) Appl. No.: 13/444,616

(22) Filed: Apr. 11, 2012

(65) Prior Publication Data
US 2012/0295019 A1 Nov. 22, 2012

Related U.S. Application Data

(60) Provisional application No. 61/488,449, filed on May 20, 2011.

(51) Int. Cl.
| | | |
|---|---|---|
| *B29C 33/38* | (2006.01) | |
| *B32B 27/08* | (2006.01) | |
| *B32B 27/36* | (2006.01) | |
| *B29D 30/30* | (2006.01) | |
| *B29C 33/30* | (2006.01) | |
| *B32B 27/18* | (2006.01) | |

(52) U.S. Cl.
CPC ........ *B29C 33/3807* (2013.01); *B29C 33/301* (2013.01); *B29D 30/30* (2013.01); *B32B 27/08* (2013.01); *B32B 27/18* (2013.01); *B32B 27/36* (2013.01); *B29K 2867/06* (2013.01); *B29K 2875/00* (2013.01)

(58) Field of Classification Search
CPC ................ B29C 33/3807; B29C 33/301; C08J 2329/00; C08J 2333/04; C08J 2333/06; C08J 2333/14; B32B 19/02; B32B 19/04

USPC ................... 264/255, 257; 427/133
See application file for complete search history.

(56) References Cited

U.S. PATENT DOCUMENTS

| | | | | |
|---|---|---|---|---|
| 3,988,388 | A | * | 10/1976 | Alberts ............... C08J 3/09 525/166 |
| 4,296,020 | A | * | 10/1981 | Magrans, Jr. ....... C08G 18/637 264/331.16 |
| 4,506,055 | A | * | 3/1985 | Bristowe ............ C08G 18/4244 428/40.1 |
| 4,822,849 | A | * | 4/1989 | Vanderlaan ............ C08G 18/68 473/118 |
| 5,521,232 | A | | 5/1996 | Gynn et al. |
| 5,549,969 | A | * | 8/1996 | Parish .................... 428/301.4 |
| 5,601,049 | A | | 2/1997 | Hordis et al. |
| 7,118,699 | B2 | * | 10/2006 | Lauersdorf et al. ........ 264/255 |
| 9,511,563 | B2 | | 12/2016 | Adams et al. |
| 2003/0057594 | A1 | | 3/2003 | Anderson et al. |
| 2004/0023012 | A1 | * | 2/2004 | Kia et al. ................. 428/212 |
| 2004/0023050 | A1 | * | 2/2004 | Kia ...................... B32B 17/04 428/480 |
| 2004/0033347 | A1 | | 2/2004 | Lauersdorf et al. |
| 2007/0273064 | A1 | | 11/2007 | Johnson |
| 2012/0040174 | A1 | | 2/2012 | Adams et al. |

FOREIGN PATENT DOCUMENTS

EP 1386724 2/2004

OTHER PUBLICATIONS

PCT International Search Report dated Aug. 1, 2012 for PCT International Application No. PCT/US2012/037790.

* cited by examiner

*Primary Examiner* — Dah-Wei D. Yuan
*Assistant Examiner* — Jose Hernandez-Diaz
(74) *Attorney, Agent, or Firm* — Avery N. Goldstein; Blue Filament Law PLLC

(57) ABSTRACT

Tooling packages for mold building structures, mold structures, and methods of making mold structures are described.

9 Claims, 3 Drawing Sheets

Fig. 1

| |
|---|
| 5 |
| 10 |
| 15 |
| 20 |
| 25 |
| 30 |

Fig. 2

| |
|---|
| 40 |
| 45 |
| 50 |
| 55 |
| 60 |
| 65 |
| 70 |
| 75 |
| 80 |

Fig. 3

| |
|---|
| 40 |
| 50 |
| 55 |
| 60 |
| 65 |
| 70 |
| 75 |
| 80 |

Fig. 4

| |
|---|
| 90 |
| 95 |
| 100 |
| 105 |
| 110 |
| 115 |
| 120 |

Fig. 5

| |
|---|
| 125 |
| 130 |
| 135 |
| 140 |
| 145 |
| 150 |
| 155 |

Fig. 6

| |
|---|
| 158 |
| 160 |
| 165 |
| 170 |
| 175 |
| 180 |
| 185 |

Fig. 7

| |
|---|
| 190 |
| 195 |
| 200 |
| 205 |
| 210 |
| 215 |

Fig. 8

| |
|---|
| 220 |
| 225 |
| 230 |

COMPLETE TOOLING PACKAGES FOR MOLD BUILDING STRUCTURES

BACKGROUND OF THE INVENTION

The invention relates to molds, and more particularly to complete tooling packages for mold building structures.

The walls of a mold are formed around a plug. The mold replicates the contours of the plug in reverse. In the process of making mold structures to be used for manufacturing laminated fiberglass reinforced parts and thermoformed parts, tooling packages are developed to provide consistent appearance (surface profile) and dimensional control or stability in the finished parts. Tooling packages provided typically include various layers of laminated structure in an attempt to achieve this control.

One example of a conventional mold structure is shown in FIG. 1. The mold has a layer of gel coat 5, followed by barrier coat 10. There is a vinyl ester skin laminate 15 with a tooling resin layer 20 after it. There is a balsa wood core 25 followed by a second tooling resin layer 30.

However, present tooling packages can suffer from one or more problems. The balsa wood core can cause adhesion problems if the core is not applied at the proper time. The balsa is laid by hand which increases the time needed to make the mold. Some tooling resins have had problems with the fillers separating. In addition, excessive heat build-up can cause dimensional instability related to a dimensional change due to the exothermic reaction during the part making process. A minimum temperature of about 120° F. to about 130° F. is needed, with a temperature of about 120° F. to about 150° F. being desirable. However, desirably the temperature should not get above about 160° F. In addition, there can also be print-through of the glass fibers and/or balsa, or a surface that requires resurfacing.

All of these defects lead to additional processing time in providing a useful mold (tool) that can be used to provide good quality parts pulled from the mold. Moreover, conventional mold structures limit the useful life of the mold as it relates to the numbers of pulls.

BRIEF DESCRIPTION OF THE DRAWINGS

FIG. 1 shows an example of a conventional mold structure.

FIG. 2 shows one example of a mold structure of the present invention.

FIG. 3 shows another example of a mold structure of the present invention.

FIG. 4 shows another example of a mold structure of the present invention.

FIG. 5 shows another example of a mold structure of the present invention.

FIG. 6 shows another example of a mold structure of the present invention.

FIG. 7 shows another example of a mold structure of the present invention.

FIG. 8 shows another example of a mold structure of the present invention.

SUMMARY AND DETAILED DESCRIPTION OF THE INVENTION

This invention focuses on the tooling package used to make a mold. The tooling package allows a mold to be made in a short time and requires very little if any resurfacing. The mold can be used multiple times without the distortion typically found during high temperature exothermic part making.

The tooling packages identified here have demonstrated significant improvements compared to the standard tooling packages presently used in the industry. The user may select the needed package based on the part's dimensional tolerances, processing heat requirements, and desired throughput.

Some embodiments of the tooling packages have improved mechanical properties, for example, flex strength/modulus, tensile strength/modulus/elongation at break, water absorption, impact, high heat distortion temperature (HDT) and high temperature resistance, and improved finish (reduced print-through). There is a better mechanical bond between the layers because there is no balsa wood core.

The thinner mold depth or cross-section allows reduced manufacturing times. Depending on the size of the mold, the manufacturing time can be reduced from about 7 days to about 3 days for a large tool, and from about 5 days to about 2 days for a smaller tool. There is less exothermic temperature during part making than with conventional molds.

The molds made using the various tooling packages allow more pulls and have a longer mold life compared to conventional molds.

In the tooling, a barrier coat (if present) protects the tooling gel coat from the heat generated by the fiberglass layers and the resin shrinkage that causes fiber print. It will protect and enhance the surface profile and help attain a higher gloss when used behind the gel coat. Molds can be made with or without layers of core material, and with or without barrier coats.

The structures include one or more of barrier coat layers, tooling resin layers, core layers, mold building compound layers, high temperature tooling compound layers, and premium tooling resin layers. These materials and methods of making them are described below.

Figure 8:
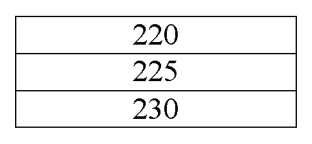

The tooling packages can be used to make molds for both open mold processes and closed mold processes, such as vacuum thermoforming. Closed molding processes may require higher temperature resistance, and FIGS. 4-8 show examples of tooling packages which have higher temperature resistance.

FIG. 2 shows one example of a mold structure. There is a gel coat 40. The gel coat can be any suitable tooling gel coat material, as is known to those of skill in the art. There is a barrier coat 45, as described below. There are two layers of impregnated tooling resin 50, 55, each of which comprises 3 layers of 1.5 oz glass impregnated with tooling resin, as described below. There are three layers of core 60, 65, 70, as described below, each of which is about 118 mils thick. There are two more layers of impregnated tooling resin 75, 80, each of which comprises 3 layers of 1.5 oz glass impregnated with tooling resin. The impregnated tooling resin layers are typically about 100 mils thick. The core layers are typically each about 80 to about 120 mils thick, and the overall thickness of the core is about 360 mils. The total thickness of the mold is typically just over about ½ in.

FIG. 3 illustrates another example which is similar to the structure of FIG. 2, except that there is no barrier coat.

Another example of the mold structures is shown in FIG. 4. There is a gel coat 90. There is a layer of mold building compound 95, as described below, which is about 40 mils thick. There is a layer of impregnated tooling resin 100, which comprises 2 layers of 1.5 oz glass impregnated with tooling resin. There is a layer of mold building compound 105, which is about 100 mils thick. This is followed by a layer of impregnated tooling resin 110, which comprises 5 layers of 1.5 oz glass impregnated with tooling resin. There is another layer of about 100 mils of mold building compound 115, and another layer of impregnated tooling resin 120, which comprises 5 layers of 1.5 oz glass impregnated with tooling resin. Mold building compound layers 105 and 115 are typically about 80 to about 100 mils. Impregnated tooling resin layer 100 is typically about 70 mils, and impregnated tooling resin layers 110 and 120 are typically about 150 mils.

FIG. 5 shows an example in which two of the layers of mold building compound are blown. This is achieved by including a foaming agent in the mold building compound, as described below. There is a gel coat 125. There is a layer of mold building compound 130, which is about 40 mils thick. There is a layer of impregnated tooling resin 135, which comprises 2 layers of 1.5 oz glass impregnated with tooling resin. There is a layer of blown mold building compound 140, which is about 100 mils thick. This is followed a layer of impregnated tooling resin 145, which comprises 5 layers of 1.5 oz glass impregnated with tooling resin. There is another layer of blown mold building compound 150 about 100 mils thick, and another layer of impregnated tooling resin 155, which comprises 5 layers of 1.5 oz glass impregnated with tooling resin.

FIG. 6 illustrates another example of the mold structure. There is a gel coat 158. There is a barrier coat 160 of high temperature tooling compound, as described below, which is about 30 mils thick. There is a skin coat 165, which is about 90 to about 120 mils of tooling resin. There are four layers of impregnated high temperature tooling compound 170, 175, 180, 185, each of which is fiberglass impregnated with high temperature tooling compound, as described below, and is typically in a range of about 80 to about 100 mils thick. There is typically about 15-30% glass fiber in the high temperature tooling compound.

FIG. 7 illustrates another example of the mold structure. There is a gel coat 190 which is about 40 to about 60 mils of a high temperature tooling compound. There are five layers of impregnated high temperature tooling compound 195, 200, 205, 210, 215 each of which is fiberglass impregnated with high temperature tooling compound and is typically in range of about 80 to about 100 mils thick. There is typically about 15-30% glass fiber in the high temperature tooling compound.

FIG. 8 illustrates another example of the mold structure. There is a gel coat 220 which is about 20 to about 40 mils thick. The gel coat 220 is followed by two premium tooling resin impregnated layers 225, 230, each of which is fiberglass impregnated with premium tooling resin. Each of the premium tooling resin impregnated layers is about 240 mils thick, and contains about 28 to about 33% glass fiber having a chop length of about 0.5 to about 1.25 in.

Barrier Coat

The barrier coat is made by mixing the unsaturated polyester resin, vinyl ester resin, and monomer 1 with a helix blade and shear blades on high. Additive 1, fumed silica, additive 2, and precipitated silica are added and mixed for about 5 min. Additive 3, accelerators, monomer 2, inhibitor, and pigment are added and mixed for about 20 min with shear and helix blades on high. Filler 1 is added with the mixer on, then the shear blade is turned off, the helix blade is set at about 30 rpm, and fillers 2 are added. The composition is mixed for about 30 min and filtered.

The polyester resin can be one or more polyester resins. The polyester resins can be a combination of orthophthalic and isophthalic polyester resins. There can be 0 to about 20 wt % orthophthalic polyester resin, and 0 to about 50 wt % isophthalic resin. There is typically more orthophthalic resin than isophthalic resin, and there is typically about twice as much orthophthalic as isophthalic. In one embodiment, there is about 10 to about 20 wt % orthophthalic resin, and about 5 to about 15% isophthalic resin.

For the barrier coat, monomer 1 is typically styrene and/or vinyl toluene, and monomer 2 is typically diallyldimethylammonium chloride (MDADMAC).

Suitable additives comprise at least one material selected from defoamers, thickening agents, wetting agents, surfactants, and mixtures thereof. For the barrier coat, additive 1 can be a thickening agent, additive 2 can be a surfactant, and additive 3 can be defoamer, thickening agent, and/or surfactant.

Suitable accelerators comprise at least one material selected from cobalt octoate, copper napthanate, potassium octoate, dimethylaniline (DMA), N,N-dimethylaceto acetamide (DMAA), N,N-dimethyl-p-toluidine (DMPT), quaternary ammonium salts and mixtures thereof.

Suitable inhibitors comprise at least one material selected from 1,4 napthaquinone, p-benzoquinone and mixtures thereof.

Suitable fillers comprise hollow microspheres and at least one material selected from potassium aluminum silicate and calcium silicate. The hollow microspheres are comprised of a material selected from the group consisting of silicate glass, ceramic, and plastic microspheres. For the barrier coat, filler 1 can be calcium silicate, and filler 2 can be ceramic, glass, and plastic microspheres. Microspheres are generally added last so that they are not damaged by the mixing.

U.S. Pat. No. 7,118,699, which is incorporated herein by reference, describes a barrier coat that could be used in the present invention.

| Barrier Coat Formulation | |
| --- | --- |
| Material | Range |
| Unsaturated Polyester resin | 15-30% |
| Vinyl ester resin | 35-43% |
| Monomer 1 | 0-25% |
| Additive 1 | 0.1-5.0% |
| Fumed Silica | 1-5% |
| Additive 2 | 0.1-5.0% |
| Precipitated Silica | 1-5% |
| Additive 3 | 0.1-5.0% |
| Accelerators | 0.1-5.0% |
| Monomer 2 | 0.1-3% |
| Inhibitor | 0-1% |
| Pigment | 0-10% |
| Filler 1 | 1-15% |
| Filler 2 | 1-15% |

All percentages are weight percent based on the total composition.

Core

The core is made by mixing the unsaturated polyester resins, vinyl ester resin, thickening agents, and solvent for about 15 min with a helix blade and a shear blade on high. Fumed silica, monomer, and coupling agent are then added and mixed on high for about 15 min with the shear and helix blades on high. Inhibitor and accelerators are added and mixed for about 5 min with the helix and shear blades on high. The shear blade is turned off, the helix blade is set on slow, and the fillers are added. The composition is mixed for about 20 min with the helix blade on high and then filtered.

The polyester resin can be one or more polyester resins. The polyester resins can be a combination of orthophthalic and isophthalic polyester resins. There can be about 20 to about 30% orthophthalic resin, and about 20 to about 30% isophthalic resin. There is typically about the same amount of orthophthalic resin and isophthalic resin.

The additives, accelerators, inhibitors are the same as those described above.

The fillers are typically calcium silicate, potassium aluminum silicate, and microspheres.

The solvent for the core is typically acetone.

The monomer can be styrene, and/or vinyl toluene.

U.S. application Ser. No. 12/853,382, filed Aug. 10, 2010, entitled Low Density Coring Material, and Ser. No. 12/891,168, filed Sep. 27, 2010, entitled Low Density Coring Material, which are incorporated herein by reference, describe materials which could be used as the core.

| Core Formulation | |
|---|---|
| Material | Range |
| Unsaturated Polyester resins | 40-60% |
| Vinyl ester resin | 25-35% |
| Thickening Agents | 0.1-10% |
| Solvent | 0-5% |
| Fumed Silica | 1-5% |
| Monomer | 0-20% |
| Coupling Agent | 0-3% |
| Inhibitor | 0-1% |
| Accelerators | 0.1-5% |
| Fillers | 1-25% |

High Temperature Tooling Compound

The high temperature tooling compound is made by mixing the unsaturated polyester resin, vinyl ester resin, and thixotrope with a helix blade at 20 rpm and shear blade on high (about 1100 to about 1200 rpm). Accelerators, inhibitor, additive, and monomer are added and mixed for about 5 min with the helix blade at about 30 rpm and the shear blades on high (about 1200 to about 1300 rpm). With the helix blade on high, the pigment, and fillers are added and mixed until the batch temperature reaches about 105° F. Mixing continues for about 40 min while the temperature is maintained between about 105° F. and about 120° F. to about 130° F. The mixer speed can be reduced if needed. The shear blade is turned off, the helix blade is set on slow, and the monomers and additive are added. The composition is mixed for about 30 min with the helix blade on high and then filtered.

The polyester resin can be one or more polyester resins. The high temperature tooling compound typically includes only isophthalic polyester resin.

For the high temperature tooling compound, monomer 1 can be styrene alone or in combination with vinyl toluene, and monomer 2 can be alpha methyl styrene alone or in combination with vinyl toluene. Monomer 1 is typically styrene, and monomer 2 is typically vinyl toluene and alpha methyl styrene, with additional styrene added if needed. All three monomers can be included in the overall formulation, if desired. Typically, the amount of styrene is about 5% to about 20%, the amount of vinyl toluene is about 3% to about 10%, and the amount of alpha methyl styrene is about 3% to about 10%.

For the high temperature tooling compound, additive 1 is typically a defoamer, and additive 2 is typically a wetting agent and/or a surfactant The fillers for the high temperature tooling compound typically include about the same amount of calcium silicate and potassium aluminum silicate. There can be about 10 to about 20 wt % calcium silicate and about 10 to about 20 wt % potassium aluminum silicate. More than one type of calcium silicate and/or potassium aluminum silicate can be used, if desired.

| High Temperature Tooling Compound Formulation | |
|---|---|
| Material | Range |
| Unsaturated Polyester Resin | 5-20% |
| Vinyl ester resin | 28-38% |
| Thixotrope | 0.1-5% |
| Accelerators | 0.1-5% |
| Inhibitor | 0-1% |
| Additive 1 | 0-5% |
| Monomer 1 | 0-10% |
| Pigment | 0-10% |
| Fillers | 20-40% |
| Monomer 2 | 5-25% |
| Additive 2 | 0-3% |

Tooling Resin

The tooling resin is made by mixing the unsaturated polyester resin, vinyl ester resin, and monomers with the helix blade and shear blades at low speed. The fumed silica, additives, accelerators, and inhibitors are added and the contents mixed at high speed for about 30 min.

The polyester resin can be one or more polyester resins. The tooling resin typically includes only dicyclopentadiene (DCPD) polyester resin. There is typically about 35 to about 55 wt % DCPD.

The monomer can be one or more of styrene, vinyl toluene, and alpha methyl styrene. In one embodiment, the monomer is styrene. In another embodiment, there can be about 0.1 to about 10% styrene, about 0.1 to about 10% vinyl toluene, and about 0.1 to about 5% alpha methyl styrene.

The additives, accelerators, and inhibitors are the same as those described above.

| Tooling Resin Formulation | |
|---|---|
| Material | Range |
| Unsaturated Polyester Resin | 35-55% |
| Vinyl Ester | 40-50% |
| Monomers | 0-20% |
| Fumed Silica | 0-3% |
| Additives | 0-3% |
| Accelerators | 0.1-5% |
| Inhibitors | 0.1-5% |

Mold Building Compound

The mold building compound is made by mixing the unsaturated polyester resins, vinyl ester resin, and thixotrope for about 5 min with the helix and shear blades on low. The additives, accelerator, monomer, inhibitors, and pigment are added. The helix and shear blades are turned to high, and the composition is mixed for about 5 min. The fillers are added, and the contents are mixed until the batch temperature reaches about 105° F. Mixing continues for about 40 min while the temperature is maintained between about 105° F. and about 120° F. to about 130° F. The mixer speed can be reduced if needed. The shear blade is then turned off, the helix blade is set on slow, and the monomer is added. The composition is mixed for about 15 min with the helix blade on high (shear blade is off) and then filtered.

The polyester resin can be one or more polyester resins. The polyester resin is typically about equal amounts of DCPD and isophthalic polyester resin. There can be about 10 to about 20 wt % DCPD, and about 10 to about 20 wt % isophthalic resin.

For the mold building compound, monomer 1 is typically MDADMAC, and monomer 2 is typically styrene and/or vinyl toluene.

The fillers are typically primarily calcium silicate, with smaller amounts of microspheres. Potassium aluminum silicate is typically not included. For example, there can be about 27 to about 37 wt % calcium silicate, and about 1 to about 5% microspheres.

Mold Building Compound Formulation

| Material | Range |
| --- | --- |
| Unsaturated Polyester Resins | 20-40% |
| Vinyl Ester Resin | 20-30% |
| Thixotrope | 0.1-5% |
| Additives | 0-5% |
| Accelerator | 0.1-5% |
| Monomer 1 | 0.1-3% |
| Inhibitors | 0-1% |
| Pigment | 0-10% |
| Fillers | 20-40% |
| Monomer 2 | 0-20% |

Blowing Agent

The blowing agent is made putting a solvent in a mixer on low and adding a general purpose foaming agent and mixing for about 15 min. The mixture is filtered. The solvent for the blowing agent is typically N-methyl-2-pyrrolidone.

Blowing Agent Formulation

| Material | Range |
| --- | --- |
| Solvent | 70-80% |
| Foaming Agent | 20-30% |

The blowing agent is typically added to the mold building compound at the time the mold building compound is applied, for example, when the catalyst is added. When the mold building compound is applied by spraying, the catalyst and blowing agent would typically be added in the spray head.

Premium Tooling Resin

The premium tooling resin is made by mixing the unsaturated polyester resin, hybrid urethane resin together, adding additives, accelerators, and inhibitors and mixing the contents at high speed for about 5 min. The filler and fumed silica are added, and the contents mixed for about 30 min. The monomer is then added and mixed for about 10 min.

The polyester resin typically comprises shrink-controlled polyester resin. Shrink-controlled polyester resins are believed to contain a low profile additive. Suitable shrink-controlled polyester resins include, but are not limited to, Polylite® 33540-00, available from Reichhold. Other comparable shrink-controlled polyester resins could also be used.

The hybrid urethane resin can be an isocyanurate vinyl ester resin, such as Dion 31040, available from Reichhold. Comparable hybrid urethane resins could also be used.

The monomer is typically one or more of styrene, vinyl toluene, and alpha methyl styrene.

The filler is typically calcium carbonate.

The additives, accelerators, and inhibitors are the same as those described above.

Premium Tooling Resin Formulation

| Material | Range |
| --- | --- |
| Shrink-Controlled Polyester Resins | 40-50% |
| Hybrid Urethane Resin | 1-10% |
| Additives | 0-3% |
| Accelerator | 0.1-5% |
| Inhibitors | 0-1% |
| Fumed Silica | 0-5% |
| Filler | 45-55% |
| Monomer | 0-10% |

Example

A barrier coat was made with the following formulation.

| Material | % |
| --- | --- |
| Unsaturated Polyester resin | 22 |
| Vinyl ester resin | 39 |
| Monomer 1 | 13 |
| Additive 1 | 0.5 |
| Fumed Silica | 2 |
| Additive 2 | 0.2 |
| Precipitated Silica | 1.8 |
| Additive 3 | 1.4 |
| Accelerators | 1.1 |
| Monomer 2 | 0.4 |
| Inhibitor | 0.011 |
| Pigment | 0.6 |
| Filler 1 | 8 |
| Filler 2 | 10 |

The unsaturated polyester resin was about 14% orthophthalic resin and about 8% isophthalic resin. Monomer 1 was styrene, additive 1 was a thickening agent, additive 2 was a surfactant, additive 3 was a defoamer, monomer 2 was MDADMAC, filler 1 was calcium silicate (Nygloss 8), and filler 2 was microspheres.

Core material was made with the following formulation.

| Material | % |
| --- | --- |
| Unsaturated Polyester resins | 49 |
| Vinyl ester resin | 28 |
| Thickening Agents | 1 |
| Solvent | 1 |
| Fumed Silica | 2 |
| Monomer | 7 |
| Coupling Agent | 0.05 |
| Inhibitor | 0.005 |
| Accelerators | 0.4 |
| Fillers | 12 |

The unsaturated polyester resin was about 26% orthophthalic resin and about 23% isophthalic resin, the monomer was styrene, and the fillers were a combination of calcium silicate, potassium aluminum silicate, and microspheres.

Blowing Agent was made with the following formulation.

| Material | Range |
| --- | --- |
| Solvent | 74% |
| Foaming Agent | 26% |

The solvent was N-methyl-2-pyrrolidone.

High temperature tooling compound was made with the following formulation.

| Material | % |
| --- | --- |
| Unsaturated Polyester Resin | 11 |
| Vinyl ester resin | 33 |
| Thixotrope | 2 |
| Accelerators | 0.6 |
| Inhibitor | 0.02 |
| Additive 1 | 0.5 |
| Monomer 1 | 4.7 |
| Pigment | 2 |
| Fillers | 32 |
| Monomer 2 | 16 |
| Additive 2 | 0.4 |

The polyester resin was isophthalic resin, additive 1 was a defoamer, monomer 1 was styrene, the fillers included about 15.4% potassium aluminum silicate, about 15.4% calcium silicate (Nygloss 8), and about 1.2% calcium silicate (Nyad G) (both available from Nyco), monomer 2 was about 9% styrene, about 5.5% vinyl toluene, and about 5.5% alpha methyl styrene, and additive 2 was a wetting agent and surfactant.

Tooling resin was made with the following formulation.

| Material | % |
| --- | --- |
| Unsaturated Polyester Resin | 44 |
| Vinyl Ester | 44 |
| Monomers | 10 |
| Fumed Silica | 0.1 |
| Additives | 0.7 |
| Accelerators | 0.5 |
| Inhibitors | 0.03 |

The polyester resin was DCPD, and the monomer was about 4% styrene, about 4% vinyl toluene, and about 2% alpha methyl styrene.

Mold building compound was made with the following formulation.

| Material | Total |
| --- | --- |
| Unsaturated Polyester Resins | 27 |
| Vinyl Ester Resin | 25 |
| Thixotrope | 1.3 |
| Additive | 0.2 |
| Accelerator | 0.7 |
| Monomer 1 | 0.4 |
| Inhibitors | 0.08 |
| Pigment | 0.5 |
| Fillers | 34.5 |
| Monomer 1 | 10.5 |

The polyester resin was about 13.4% DCPD and about 13.4% isophthalic resin, monomer 1 was MDADMAC, monomer 2 was styrene, and the fillers were about 31.5% calcium silicate (Nygloss 8) and 3% microspheres.

A premium tooling resin was made with the following formulation.

| Material | Total |
| --- | --- |
| Shrink-Controlled Polyester Resins | 45% |
| Hybrid Urethane Resin | 4% |
| Additives | 0.4% |
| Accelerator | 0.6% |
| Inhibitors | 0.04% |
| Fumed Silica | 0.7% |
| Filler | 49% |
| Monomer | 0.7% |

The filler was calcium carbonate, and the monomer was styrene.

Molds were made according to the structures shown in FIGS. 2-8. The mechanical properties of the structures improved from FIG. 2 to FIG. 7. The structures of FIGS. 6 and 7 had the mechanical best properties. The structure made with High Temperature Tooling Compound (FIG. 7) provides better flexural properties (measured according to ASTM D-790) than existing structures (FIG. 1) at equivalent thickness.

The structure made with the premium tooling resin (FIG. 8) had the best surface finish. The shrinkage was close to zero. Although its flexural strength and flexural modulus were lower than the structure made with the High Temperature Tooling Compound, the extension at break was higher. The structure made with the premium tooling resin exceeded the flexural strength, flexural modulus, and extension at break of the existing structures.

| | Flexural Strength (psi) | Flexural Modulus (psi) | Extension at break (%) |
| --- | --- | --- | --- |
| High Temperature Tooling Compound - FIG. 7 | 26,100 | 1,557,968 | 2.04 |
| Premium Tooling Resin - FIG. 8 | 20,400 | 1,164,999 | 3.43 |
| Prior Art A | 7,260 | 632,522 | 1.21 |
| Prior Art B | 5,550 | 678,220 | 0.96 |

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of making a mold comprising:
providing a plug;
depositing a gel coat layer on the plug;
depositing a first premium tooling resin impregnated layer directly on the gel coat layer and a second premium tooling resin layer on the first premium tooling resin impregnated layer, both of the first and second premium tooling resin impregnated layers having a thickness of about 240 mils and comprising fiberglass impregnated with said premium tooling resin containing chopped fiber in both said first and second premium tooling resin impregnated layers in an amount of 28 to 35 total wt % chopped glass fiber having a chop length of 0.5 to 1.25 inches;
wherein the premium tooling resin comprises:
40 to 50 wt % shrink-controlled polyester resin
1 to 10 wt % isocyanurate vinyl ester resin;
0 to about 3 wt % additives;
0 to about 5 wt % accelerators;
0 to about 1 wt % inhibitors;
0 to about 5 wt % fumed silica;
0 to about 10 wt % monomer; and
45 to 55 wt % filler; and
removing the plug.

2. The method of claim 1 further comprising depositing at least one core layer comprising:
40 to 60 wt % unsaturated polyester resin;
25 to 35 wt % vinyl ester resin;
0 to about 10 wt % thickening agents;
0 to about 5 wt % solvent;
0 to about 5 wt % fumed silica;
0 to about 20 wt % monomer;
0 to about 3 wt % coupling agent;
0 to about 1 wt % inhibitors;
0 to about 5 wt % accelerators; and
1 to 25 wt % filler.

3. The method of claim 1 further comprising depositing at least one mold building compound layer comprising:
20 to 40 wt % unsaturated polyester resin;
20 to 30 wt % vinyl ester resin;
0 to about 5 wt % thixotrope;
0 to about 5 wt % additives;
0 to about 5 wt % accelerators;
0 to about 3 wt % first monomer;
0 to about 1 wt % inhibitors;
0 to about 10 wt % pigment;
20 to 40 wt % filler; and
0 to about 20 wt % second monomer.

4. The method of claim 1 further comprising depositing a skin coat layer comprising tooling resin.

5. The method of claim 1 wherein said filler is calcium carbonate.

6. The method of claim 1 further comprising a low profile additive in said shrink-controlled polyester resin.

7. A mold structure comprising:
a gel coat layer;
a first premium tooling resin impregnated layer deposited directly on the gel coat layer and a second premium tooling resin layer deposited on to the first premium tooling resin impregnated layer, both of the first and second premium tooling resin impregnated layers having a thickness of about 240 mils and comprising fiberglass impregnated with said premium tooling resin containing chopped fiber in both said first and said second premium tooling resin impregnated layers in an amount of 28 to 35 wt % chopped glass fiber having a chop length of 0.5 to 1.25 inches;
wherein the premium tooling resin comprises:
40 to 50 wt % shrink-controlled polyester resin;
1 to 10 wt % isocyanurate vinyl ester resin;
0 to about 3 wt % additives;
0 to about 5 wt % accelerators;
0 to about 1 wt % inhibitors;
0 to about 5 wt % fumed silica;
0 to about 10 wt % monomer; and
45 to 55 wt % filler.

8. The mold structure of claim 7 wherein said gel coat has a thickness of about 20 to about 40 mils.

9. The mold structure of claim 7 further comprising a low profile additive in said shrink-controlled polyester resin.

* * * * *